US012664248B2

(12) United States Patent
Ben Zakai et al.

(10) Patent No.: US 12,664,248 B2
(45) Date of Patent: Jun. 23, 2026

(54) AUTOMATIC AUTHENTICATION FOR USER-DEPENDENT FUNCTIONALITY

(71) Applicant: SAILPOINT TECHNOLOGIES, INC., Wilmington, DE (US)

(72) Inventors: David Ben Zakai, Ramat Gan (IL); Eldar Kleiner, Tel Aviv-Jaffa (IL); Avishai Lazar, Etz Efraim (IL); Timor Eizenman, Tel Aviv-Jaffa (IL)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 18/325,019

(22) Filed: May 29, 2023

(65) Prior Publication Data

US 2024/0403405 A1 Dec. 5, 2024

(51) Int. Cl.
G06F 21/41 (2013.01)

(52) U.S. Cl.
CPC ..................................... G06F 21/41 (2013.01)

(58) Field of Classification Search
CPC ............ G06Q 20/4014; G06Q 20/3674; H04L 63/08; H04L 63/0807; H04L 63/0815; H04L 63/0823; H04L 63/083; H04L 63/0838; H04L 63/0846; H04L 63/0853; H04L 63/0861; H04L 63/0869; H04L 63/0876; H04L 63/0884; H04L 63/0892; G06F 21/31; G06F 21/41
See application file for complete search history.

(56) References Cited

U.S. PATENT DOCUMENTS

| | | | |
|---|---|---|---|
| 7,725,931 B2 | 5/2010 | Ito | |
| 7,784,044 B2 | 8/2010 | Buban | |
| 7,865,931 B1 | 1/2011 | Stone | |
| 8,578,499 B1 | 11/2013 | Zhu et al. | |
| 8,607,208 B1 | 12/2013 | Arnold | |
| 9,191,381 B1 * | 11/2015 | Popp | H04L 63/0823 |
| 9,241,004 B1 | 1/2016 | April | |
| 9,251,114 B1 | 2/2016 | Ancin | |
| 9,384,345 B2 | 7/2016 | Dixon et al. | |
| 9,576,070 B2 | 2/2017 | Steiner | |
| 9,635,042 B2 | 4/2017 | Brown et al. | |

(Continued)

FOREIGN PATENT DOCUMENTS

| | | |
|---|---|---|
| CN | 103942073 | 12/2017 |
| EP | 3422236 B1 | 6/2022 |
| WO | WO 2019237590 | 12/2019 |

OTHER PUBLICATIONS

International Application PCT/IB2023/054512 Search Report dated Jul. 30, 2023.

(Continued)

*Primary Examiner* — Michael Simitoski
(74) *Attorney, Agent, or Firm* — Sprinkle IP Law Group

(57) ABSTRACT

A method includes obtaining, by an application running on a computing device, a single sign-on (SSO) username of a user who is using the device, without input from the user. The method further includes passing the SSO username to an identity provider (IdP) so as to authenticate the user to the application via an SSO process, thereby causing the IdP to send information about the user to the application, and performing a function, by the application, based on the information. Other embodiments are also described.

18 Claims, 2 Drawing Sheets

(56) References Cited

U.S. PATENT DOCUMENTS

| | | | |
|---|---|---|---|
| 9,674,145 B2 | 6/2017 | Chien | |
| 10,257,182 B2 | 4/2019 | Child et al. | |
| 10,805,314 B2 | 10/2020 | Jakobsson et al. | |
| 10,904,218 B2 | 1/2021 | Muttik | |
| 11,089,005 B2 * | 8/2021 | Ford | H04L 63/0815 |
| 11,178,188 B1 | 11/2021 | Wu et al. | |
| 11,295,029 B1 | 4/2022 | Greenblatt | |
| 11,405,398 B2 | 8/2022 | Sakamoto | |
| 11,537,706 B1 | 12/2022 | Sharifi Mehr | |
| 11,831,617 B2 | 11/2023 | Lewin | |
| 11,979,383 B1 | 5/2024 | Litty | |
| 12,277,209 B2 | 4/2025 | Ben Zakai | |
| 12,561,128 B2 | 2/2026 | Zakai | |
| 2004/0064469 A1 | 4/2004 | Takahashi | |
| 2008/0320151 A1 | 12/2008 | McCanne | |
| 2010/0186088 A1 | 7/2010 | Banerjee et al. | |
| 2010/0250779 A1 | 9/2010 | B'far et al. | |
| 2014/0068733 A1 | 3/2014 | Belsario | |
| 2014/0298403 A1 * | 10/2014 | Qureshi | H04L 63/20 726/1 |
| 2015/0067760 A1 | 3/2015 | Waltermann et al. | |
| 2015/0074390 A1 | 3/2015 | Toback et al. | |
| 2015/0089228 A1 | 3/2015 | Kim | |
| 2015/0123983 A1 | 5/2015 | Schoening | |
| 2015/0304302 A1 | 10/2015 | Zhang | |
| 2016/0352861 A1 | 12/2016 | White | |
| 2017/0126653 A1 | 5/2017 | Lupien | |
| 2017/0264612 A1 * | 9/2017 | Kaushal | H04L 63/205 |
| 2017/0317828 A1 | 11/2017 | Reinhold | |
| 2018/0077138 A1 * | 3/2018 | Bansal | G06Q 20/325 |
| 2018/0091453 A1 | 3/2018 | Jakobsson | |
| 2018/0213059 A1 | 7/2018 | Alsina | |
| 2019/0020646 A1 | 1/2019 | Magyar | |
| 2019/0220590 A1 | 7/2019 | De Jonge | |
| 2019/0347667 A1 | 11/2019 | Zhang | |
| 2020/0028852 A1 | 1/2020 | Sakamoto | |
| 2020/0097337 A1 | 3/2020 | Borkar et al. | |
| 2020/0162454 A1 * | 5/2020 | Jain | H04L 63/0815 |
| 2020/0213336 A1 | 7/2020 | Yu et al. | |
| 2020/0380115 A1 | 12/2020 | Knight et al. | |
| 2021/0306315 A1 | 9/2021 | Wright et al. | |
| 2021/0400032 A1 | 12/2021 | Ryu | |
| 2022/0385671 A1 | 12/2022 | Silverstein | |
| 2023/0013371 A1 | 1/2023 | Liu | |
| 2023/0078849 A1 | 3/2023 | Seletskiy et al. | |
| 2023/0315835 A1 | 10/2023 | Hangzhou et al. | |
| 2023/0409680 A1 * | 12/2023 | Blachman | G06F 21/31 |
| 2024/0061673 A1 | 2/2024 | Ben Zakai | |
| 2024/0403408 A1 | 12/2024 | Murata | |
| 2025/0021692 A1 | 1/2025 | Bachar et al. | |
| 2025/0053642 A1 | 2/2025 | Ben Zakai | |
| 2025/0184354 A1 | 6/2025 | Edwards et al. | |
| 2025/0307378 A1 | 10/2025 | Kleiner | |
| 2026/0073028 A1 | 3/2026 | Belgi | |
| 2026/0100953 A1 | 4/2026 | Kleiner | |
| 2026/0106871 A1 | 4/2026 | Kleiner | |

OTHER PUBLICATIONS

Stackoverflor, "Configure Silent Authentication in Open ID Connect", pp. 1-2, Aug. 11, 2020, as downloaded from https://stackoverflow.com/questions/63351761/configure-silent-authentication-in-open-id-connect.

Meta, "Silent authentication on session expiration with oAuth2 plugin", p. 1, Jan. 30, 2023, as downloaded from https://meta.discourse.org/t/silent-authentication-on-session-expiration-with-oauth2-plugin/253349.

Chrome Developers, "User identification", pp. 1-10, May 14, 2018, as downloadd from https://developer.chrome.com/docs/apps/app_identity/.

Ben Zakai et al., U.S. Appl. No. 17/839,550, filed Jun. 14, 2022.

Wikipedia, "Salt (cryptography)," pp. 1-3, last edited Feb. 21, 2024.

mozilla.org, " Web APIs—FileReaderSync," mdn web docs, pp. 1-3, years 1998-2024, as downloaded from https://developer.mozilla.org/en-US/docs/Web/API/FileReaderSync.

mozilla.org, " Web APIs—File," mdn web docs, pp. 1-3, years 1998-2024, as downloaded from https://developer.mozilla.org/en-US/docs/Web/API/File.

Wikipedia, "NTFS," pp. 1-27, last edited May 30, 2024.

Microsoft, "Microsoft Information Protection (MIP) SDK—setup and configuration," pp. 1-11, Jan. 30, 2024.

U.S. Appl. No. 17/839,550 Office Action dated Aug. 29, 2024.

US Non-Final Office Action U.S. Appl. No. 18/617,706, dated Aug. 15, 2025.

Office Action for U.S. Appl. No. 17/839,550, dated Aug. 29, 2024, 11 pgs.

Office Action for U.S. Appl. No. 18/498,111, dated Jul. 9, 2025, 30 pgs.

Notice of Allowance for U.S. Appl. No. 18/498,111, mailed Dec. 9, 2025, 6 pgs.

Office Action for U.S. Appl. No. 18/617,706, mailed Feb. 6, 2026, 19 pgs.

Office Action for U.S. Appl. No. 18/914,179, mailed Feb. 9, 2026, 13 pgs.

Office Action for U.S. Appl. No. 18/915,395, mailed Mar. 17, 2026, 21 pgs.

Office Action for U.S. Appl. No. 18/908,924, mailed Apr. 28, 2026, 14 pgs.

* cited by examiner

AUTOMATIC AUTHENTICATION FOR USER-DEPENDENT FUNCTIONALITY

FIELD OF THE INVENTION

The present invention is related to the field of computer applications.

BACKGROUND OF THE INVENTION

Single sign-on (SSO) is an authentication technique allowing a user to access multiple independent services or applications even without entering his credentials to each of the services or applications.

An identity provider (IdP) is a service that stores and manages user identities, often for facilitating SSO authentication.

SUMMARY OF THE INVENTION

There is provided, in accordance with some embodiments of the present invention, a computing device including a communication interface and a processor. The processor is configured to execute an application on the computing device so as to obtain a single sign-on (SSO) username of a user who is using the device, without input from the user, to pass the SSO username, via the communication interface, to an identity provider (IdP) so as to authenticate the user to the application via an SSO process, thereby causing the IdP to send information about the user to the application, and to perform a function based on the information.

There is further provided, in accordance with some embodiments of the present invention, a method including obtaining, by an application running on a computing device, a single sign-on (SSO) username of a user who is using the device, without input from the user. The method further includes passing the SSO username to an identity provider (IdP) so as to authenticate the user to the application via an SSO process, thereby causing the IdP to send information about the user to the application, and performing a function, by the application, based on the information.

In some embodiments, performing the function includes sending the information to a service that facilitates functionality of the application.

In some embodiments, performing the function includes facilitating enforcement of one or more computer-usage rules.

In some embodiments, the application includes a web browser.

In some embodiments, passing the SSO username to the IdP includes passing the SSO username to the IdP without notifying the user.

In some embodiments, passing the SSO username to the IdP includes:

opening an authentication window that is not visible to the user; and submitting the SSO username to IdP via the authentication window.

In some embodiments, obtaining the SSO username includes obtaining the SSO username by:

identifying an authentication correlation ID in communication from the IdP to the device, and using the authentication correlation ID, querying for the SSO username.

In some embodiments, a service is configured to query the IdP, repeatedly, for any authentication correlation IDs issued by the IdP and respective SSO usernames to which the authentication correlation IDs are issued, and querying for the SSO username includes querying the service for the SSO username, such that the service sends the SSO username to the application.

In some embodiments, querying for the SSO username includes querying the IdP for the SSO username, such that the IdP sends the SSO username to the application.

In some embodiments, obtaining the SSO username includes obtaining the SSO username by extracting the SSO username from source code of a web page that is open on the device.

There is further provided, in accordance with some embodiments of the present invention, a computer software product including a tangible non-transitory computer-readable medium in which program instructions are stored. The instructions, when read by a processor of a computing device, cause the processor to obtain a single sign-on (SSO) username of a user who is using the device, without input from the user. The instructions further cause the processor to pass the SSO username to an identity provider (IdP) so as to authenticate the user to an application via an SSO process, thereby causing the IdP to send information about the user to the processor, and to perform a function based on the information.

The present invention will be more fully understood from the following detailed description of embodiments thereof, taken together with the drawings, in which:

DETAILED DESCRIPTION

Overview

In some organizations, the functionality of an application running on a computing device may vary with the user of the computing device. For example, a web-browser extension may regulate the user's access to particular content based on the department to which the user belongs within the organization. Such user-dependent functionality typically requires that the user be authenticated to the application. However, it may not be practical to require the user to authenticate himself, and in fact, it may be preferred that the user not be aware of the authentication at all.

To address this challenge, embodiments of the present invention automatically authenticate the user to the application. In particular, the application first obtains an SSO username of the user without input from the user. Subsequently, the application passes the username to an IdP so as to authenticate the user to the application via an SSO process. Optionally, the user may be unaware that this authentication is taking place.

To obtain the SSO username, the application may first identify an authentication correlation ID in communication from the IdP to the device. Given that each authentication correlation ID is issued for a particular username, the application may then use the authentication correlation ID to query another entity, such as the IdP, for the username of the user. Alternatively, for example, the application may extract the username from source code of a web page that is open on the device.

System Description

Figure 1:
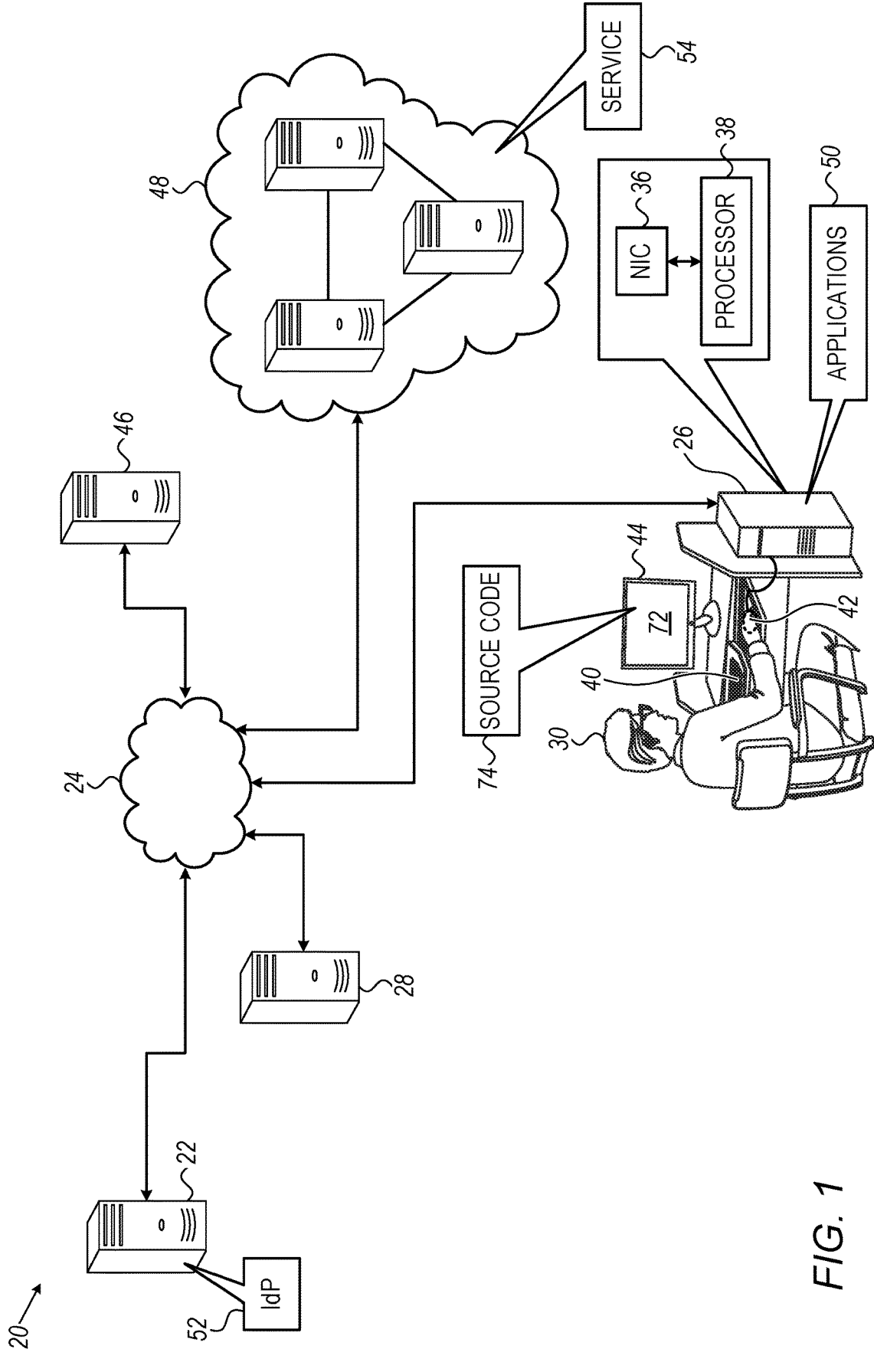
FIG. 1 is a schematic illustration of a networked computer system, in accordance with some embodiments of the present invention.

Reference is initially made to FIG. 1, which is a schematic illustration of a networked computer system 20, in accordance with some embodiments of the present invention.

FIG. 1 depicts a user 30 using a computing device 26, which may comprise, for example, a desktop computer, a laptop computer, a tablet computer, or a smartphone. Device 26 comprises a communication interface 36, such as a network interface controller (NIC), a processor 38, and one or more input/output (I/O) interfaces such as a keyboard 40, a mouse 42, or a display 44.

Processor 38 is configured to execute various applications 50 on device 26, and user 30 may interact with applications 50 via the I/O interfaces. In executing applications 50, processor 38 may exchange communication, via communication interface 36, over a network 24, such as the Internet.

For example, processor 38 may execute an email application, such as Microsoft Outlook for example. The email application may retrieve emails, over network 24, from an email server 28, and display the emails on display 44.

As another example, processor 38 may execute a web browser. The web browser may retrieve content, over network 24, from a web server 46, and display the content on display 44. Example web browsers include Mozilla Firefox, Microsoft Edge, and Google Chrome.

In some embodiments, device 26 belongs to another network, such as a local area network (LAN), that is separate from network 24.

System 20 further comprises at least one server 22 configured to execute an identity provider (IdP) 52. Any one of applications 50 may be registered with IdP 52, such that IdP 52 may authenticate user 30 to the application via an SSO process.

In some embodiments, system 20 comprises one or more servers, belonging, for example, to a cooperatively-networked server farm 48, configured to execute a service 54 that facilitates the functionality of one or more of applications 50. In such embodiments, the relevant applications 50 are configured to exchange communication with service 54 over network 24.

In some one or more computer-usage rules regulate the actions performed by user 30 on device 26. For example, user 30 may be associated with an organization (such as a school or a workplace) for which the computer-usage rules have been defined.

For example, the computer-usage rules may regulate sharing of information by user 30. For example, the rules may prohibit the user from entering his credentials or other sensitive information on certain websites. Alternatively or additionally, the rules may prohibit the user from communicating sensitive files over network 24, or may require that any such communication is encrypted and/or reported to a compliance department. As a specific example, the user may be allowed to download files from a file-sharing website, but not to upload files to the website.

As another example, the computer-usage rules may restrict the content that user 30 is allowed to access. For example, the user may be prohibited from accessing certain websites. As yet another example, the computer-usage rules may restrict accepting certain Open Authentication (OAuth) permissions, alternatively referred to as "scopes."

In such embodiments, one or more of applications 50 may be configured to facilitate enforcement of the computer-usage rules and, optionally, service 54 may be configured to facilitate this functionality, as described in U.S. application Ser. No. 17/839,550, whose disclosure is incorporated herein by reference.

For example, applications 50 may include a web browser including an extension (e.g., a plugin, an add-in, or an add-on) configured to display, and execute the functionality of, a dialog window that prompts user 30 for input relating to any usage of the web browser that potentially violates one of the computer-usage rules. For example, the dialog may prompt the user for input relating to a potentially-malicious sign-in form displayed on the web browser. In response to the input indicating a potential violation (e.g., based on an analysis of the input by service 54), the extension may warn the user of the potential violation, prevent the user from entering information (e.g., by disabling an input field), or take any other suitable action.

Alternatively or additionally (e.g., in response to instructions from service 54), the web-browser extension may modify a webpage displayed to the user even without first receiving input from the user.

As another example, an online-communication (e.g., videoconferencing) application may include an extension configured to notify user 30 of the computer-usage rules, and/or collect input from the user, via a dedicated dialog window or via a preexisting chat facility belonging to the application. This functionality may be facilitated by service 54. For example, the extension may notify the user that, per the computer-usage rules received from service 54, the user's video conference should be recorded. Alternatively or additionally, if the user instructs the application to share a file with another user, the extension may ask the user for input regarding the content of the file, send this input to service 54 for processing, and then allow or disallow the sharing of the file in response to instructions from service 54.

As yet another example, an email application may include an extension configured to modify an email prior to the display of the email by the application (e.g., responsively to instructions from service 54). For example, the extension may obfuscate content, modify links, and/or remove attachments. Alternatively or additionally, the extension may query the user (e.g., via a dedicated dialog window) for input regarding the email. For example, the extension may ask the user if the user recognizes the sender of the email and/or whether a request for information contained in the email conveys an urgent tone. Subsequently, in response to the input (e.g., in response to instructions from service 54 generated responsively to the input), the extension may retain or undo any modifications that were made to the email and/or notify the user of the relevant rules.

Typically, many computer-usage rules are user-dependent. For example, the extent to which the user is allowed to access or share sensitive information may depend on the rank of the user in the organization, the user's level of technical expertise, or the department, within the organization, to which the user belongs. Thus, facilitating the enforcement of a computer-usage rule by an application 50 may require particular information about the user.

Likewise, other functionality of applications 50 may be user-dependent. For example, an application for training the user (e.g., in the use of particular software or in particular regulatory requirements) may vary the extent or emphasis of the training responsively to the user's rank, level of technical expertise, or department.

Hence, it is typically important that the user authenticate to the relevant applications 50. As described in detail below with reference to the subsequent figures, system 20 is configured to facilitate this authentication, using IdP 52.

In general, processor 38 may be embodied as a single processor, or as a cooperatively networked or clustered set of processors. Typically, processor 38 is embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Authenticating the User

Figure 2:
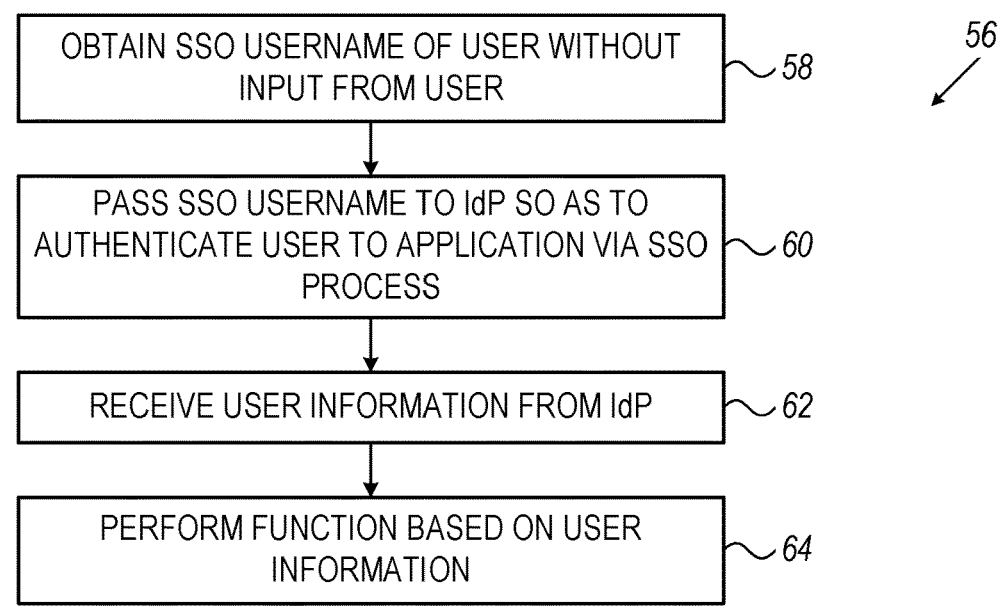
FIG. 2 is a flow diagram for an example algorithm for authenticating a user to an application and performing a function responsively thereto, in accordance with some embodiments of the present invention.

Reference is now made to FIG. 2, which is a flow diagram for an example algorithm 56 for authenticating user 30 to an application 50 (FIG. 1) and performing a function responsively thereto, in accordance with some embodiments of the present invention.

Algorithm 56 may be executed by processor 38 while the processor executes any one of applications 50 running on device 26 (FIG. 1). In other words, the software code for any one of the applications may include instructions that, when read by the processor, cause the processor to execute algorithm 56. Typically, these instructions are included in the code for an extension to the native application, such as any of the example extensions described above with reference to FIG. 1.

Algorithm 56 begins with a username-obtaining step 58, at which the application (i.e., the processor in execution of the application) obtains an SSO username of user 30 without input from the user. Further details regarding username-obtaining step 58 are provided below with reference to FIG. 1 and FIG. 3.

In general, the SSO username may be any username recognized by the organization to which the user belongs, such as the user's email address at the domain of the organization.

Next, at a username-passing step 60, the application passes the SSO username to the IdP so as to authenticate the user to the application via a standard SSO process. Optionally, username-passing step 60 may be performed without notifying the user, such that the user is unaware of the authentication.

In accordance with the standard SSO protocol, at the conclusion of the authentication process, the IdP sends the application information about the user, such as the user's title or rank within the organization or the department to which the user belongs. (For example, this information may be included in an SSO token.) This information is received by the application at an information-receiving step 62.

Finally, at a function-performing step 64, the application performs a function based on the received information.

For example, the application may send the information to service 54 (FIG. 1) so as to facilitate the enforcement of one or more computer-usage rules or facilitate any other user-dependent functionality of the application. Alternatively, the application may facilitate the enforcement of one or more computer-usage rules, or perform any other user-dependent functionality, even without sending the information to service 54.

Obtaining the SSO Username

Figure 3:
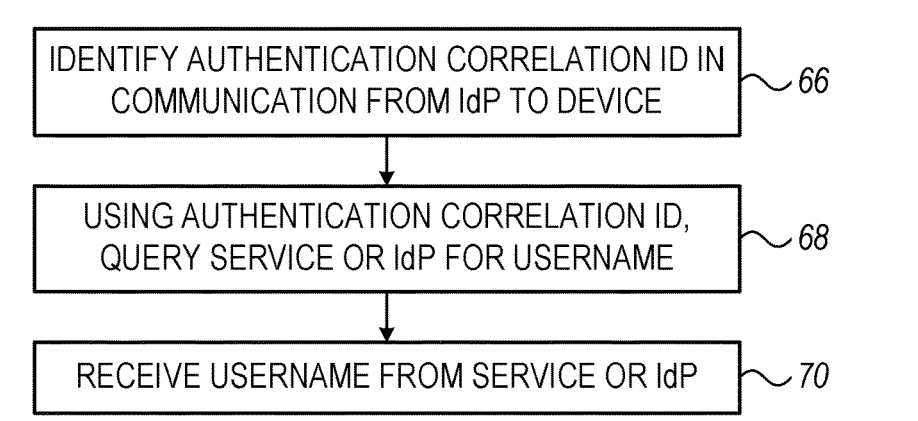
FIGS. 3-4 are flow diagrams for steps shown in FIG. 2, in accordance with some embodiments of the present invention.

Reference is now made to FIG. 3, which is a flow diagram for username-obtaining step 58, in accordance with some embodiments of the present invention.

In some embodiments, in performing username-obtaining step 58, the application first identifies an authentication correlation ID in communication from the IdP to device 26 (FIG. 1), at an ID-identifying sub-step 66. For example, the application may locate the authentication correlation ID in the header of an authentication response from the IdP.

Typically, to facilitate performance of ID-identifying sub-step 66, the application (e.g., the extension component of the application) is configured to receive a copy of each communication packet received by the device, even if the packet is directed to a different application.

Next, at a querying sub-step 68, the application, using the authentication correlation ID, queries any suitable entity for the username of user 30 (FIG. 1). In other words, the application includes the authentication correlation ID in a query submitted to the entity, such that the entity may look up the username for which the authentication correlation ID was issued by the IdP, and then communicate the username to the application.

In some embodiments, the aforementioned query is sent to a service, such as service 54 (FIG. 1). In particular, the service may be configured to query the IdP, repeatedly (e.g., periodically), for any authentication correlation IDs issued by the IdP and the respective usernames to which the authentication correlation IDs are issued. The application may therefore query the service for the username of user 30.

In other embodiments, the application queries the IdP directly.

In some embodiments, rather than communicate a separate query for each identified authentication correlation ID, the application includes multiple such authentication correlation IDs in a single query.

Finally, at a username-receiving sub-step 70, the application receives the username from the queried entity.

For an alternative embodiment of username-obtaining step 58, reference is again made to FIG. 1.

In some embodiments, application 50 is configured to obtain the username of user 30 by extracting the username from source code 74 of a web page 72 that is open on the device. (It is noted that the application that obtains the username may be a web browser in which web page 72 is open.)

For example, the application may search the source code for a particular Document Object Model (DOM) element, e.g., by searching for a particular Cascading Style Sheets (CSS) selector associated with the DOM element. Subsequently, the application may extract the username from the DOM element, e.g., by applying a regular expression (regex) to the DOM element.

For example, in the source code for a web page for a Gmail account, the email address for the account may be included in a "<a>" DOM element, which is associated with a CSS selector including an aria-label property starting with "Google Account." Hence, if the web page for the user's Gmail account is open and the user's SSO username is the user's Gmail address, the application may search for the aforementioned CSS selector, and then extract the SSO username from the "<a>" element.

Passing the SSO Username to the IdP

Figure 4:
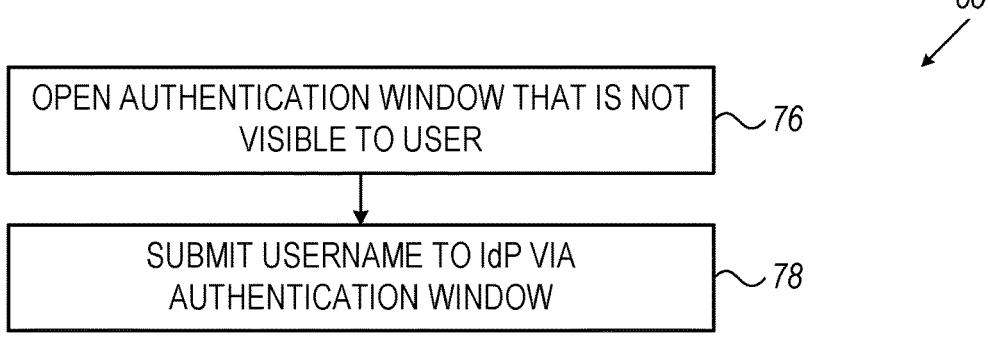

Reference is now made to FIG. 4, which is a flow diagram for username-passing step 60 (FIG. 2), in accordance with some embodiments of the present invention.

Some SSO authentication protocols, such as Security Assertion Mark-up Language (SAML) and Open Authorization 2 (OAuth2), require that the SSO username be submitted via an authentication window. For such protocols, application 50 (FIG. 1) performs username-passing step 60 by first opening an authentication window at a window-opening sub-step 76. Typically, the authentication window is not visible to the user, such that the user is unaware of the authentication. For example, the size of the window may be smaller than a predefined threshold size for visibility; as a specific example, the window may be only a single pixel in size. Alternatively or additionally, the opacity of the window may be less than a predefined threshold opacity for visibility; as a specific example, the window may have an opacity of 0.

Subsequently to opening the authentication window, the application submits the username to the IdP via the authentication window at a username-submitting sub-step 78.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing device, comprising:
a communication interface; and
a processor, configured to execute an application on the computing device so as to:
obtain a single sign-on (SSO) username of a user who is using the device, without input from the user, by:
identifying an authentication correlation ID in communication from an identity provider (IdP) to the device, and
using the authentication correlation ID, querying for the SSO username,
pass the SSO username, via the communication interface, to the IdP so as to authenticate the user to the application via an SSO process, thereby causing the IdP to send information about the user to the application, and
perform a function based on the information.

2. A method, comprising:
obtaining, by an application running on a computing device, a single sign-on (SSO) username of a user who is using the device, without input from the user, by:
identifying an authentication correlation ID in communication from an identity provider (IdP) to the device, and
using the authentication correlation ID, querying for the SSO username;
passing the SSO username to the IdP so as to authenticate the user to the application via an SSO process, thereby causing the IdP to send information about the user to the application; and
performing a function, by the application, based on the information.

3. The method according to claim 2, wherein performing the function comprises sending the information to a service that facilitates functionality of the application.

4. The method according to claim 2, wherein performing the function comprises facilitating enforcement of one or more computer-usage rules.

5. The method according to claim 2, wherein the application includes a web browser.

6. The method according to claim 2, wherein passing the SSO username to the IdP comprises passing the SSO username to the IdP without notifying the user.

7. The method according to claim 2, wherein passing the SSO username to the IdP comprises:
opening an authentication window that is not visible to the user; and
submitting the SSO username to IdP via the authentication window.

8. The method according to claim 2,
wherein a service is configured to query the IdP, repeatedly, for any authentication correlation IDs issued by the IdP and respective SSO usernames to which the authentication correlation IDs are issued, and
wherein querying for the SSO username comprises querying the service for the SSO username, such that the service sends the SSO username to the application.

9. The method according to claim 2, wherein querying for the SSO username comprises querying the IdP for the SSO username, such that the IdP sends the SSO username to the application.

10. A method, comprising:
obtaining, by an application running on a computing device, a single sign-on (SSO) username of a user who is using the device, without input from the user, by extracting the SSO username from source code of a web page that is open on the device;
passing the SSO username to an identity provider (IdP) so as to authenticate the user to the application via an SSO process, thereby causing the IdP to send information about the user to the application; and
performing a function, by the application, based on the information.

11. A computer software product comprising a tangible non-transitory computer-readable medium in which program instructions are stored, which instructions, when read by a processor of a computing device, cause the processor to:
obtain a single sign-on (SSO) username of a user who is using the device, without input from the user, by:
identifying an authentication correlation ID in communication from an identity provider (IdP) to the device, and
using the authentication correlation ID, querying for the SSO username,
pass the SSO username to the IdP so as to authenticate the user to an application via an SSO process, thereby causing the IdP to send information about the user to the processor, and
perform a function based on the information.

12. The computer software product according to claim 11, wherein the function includes sending the information to a service that facilitates functionality of the application.

13. The computer software product according to claim 11, wherein the function includes facilitating enforcement of one or more computer-usage rules.

14. The computer software product according to claim 11, wherein the instructions cause the processor to pass the SSO username to the IdP without notifying the user.

15. The computer software product according to claim 11, wherein the instructions cause the processor to pass the SSO username to the IdP by:

opening an authentication window that is not visible to the user, and submitting the SSO username to IdP via the authentication window.

16. The computer software product according to claim 11, wherein a service is configured to query the IdP, repeatedly, for any authentication correlation IDs issued by the IdP and respective SSO usernames to which the authentication correlation IDs are issued, and wherein the instructions cause the processor to query the service for the SSO username such that the service sends the SSO username to the processor.

17. The computer software product according to claim 11, wherein the instructions cause the processor to query the IdP for the SSO username such that the IdP sends the SSO username to the processor.

18. The computer software product according to claim 11, wherein the instructions cause the processor to obtain the SSO username by extracting the SSO username from source code of a web page that is open on the device.

* * * * *